United States Patent
Despiegel et al.

(10) Patent No.: US 11,568,199 B2
(45) Date of Patent: Jan. 31, 2023

(54) METHOD OF SECURE CLASSIFICATION OF INPUT DATA BY MEANS OF A CONVOLUTIONAL NEURAL NETWORK

(71) Applicant: IDEMIA IDENTITY AND SECURITY FRANCE, Courbevoie (FR)

(72) Inventors: Vincent Despiegel, Courbevoie (FR); Hervé Chabanne, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 593 days.

(21) Appl. No.: 16/591,084

(22) Filed: Oct. 2, 2019

(65) Prior Publication Data
US 2020/0110980 A1    Apr. 9, 2020

(30) Foreign Application Priority Data
Oct. 4, 2018   (FR) ........................ 1859203

(51) Int. Cl.
*G06V 10/82* (2022.01)
*G06N 3/04* (2006.01)
(Continued)

(52) U.S. Cl.
CPC .............. *G06N 3/04* (2013.01); *G06K 9/628* (2013.01); *G06K 9/6256* (2013.01);
(Continued)

(58) Field of Classification Search
CPC .. G06K 9/6256; G06K 9/6274; G06K 9/6277; G06K 9/628; G06N 3/04;
(Continued)

(56) References Cited

U.S. PATENT DOCUMENTS 10,719,693 B2 *  7/2020  Liu ..................... G06V 10/764
11,436,474 B2 *  9/2022  Chabanne ............ G06N 3/0454
(Continued)

OTHER PUBLICATIONS

International Search Report and Written Opinion of the French National Institute of Industrial Property (INPI) for FR1859203 dated Jul. 8, 2019.
(Continued)

*Primary Examiner* — Ian L Lemieux
(74) *Attorney, Agent, or Firm* — Womble Bond Dickinson (US) LLP

(57) ABSTRACT

A method of secure classification of input data by a convolutional neural network (CNN), including (a) determination, by application of the CNN to the input data, of a first classification vector associating with each of a plurality of potential classes a representative integer score of the probability of the input data belonging to the potential class, the first vector corresponding to one possible vector, each possible vector of the first set associating with each of the plurality of potential classes an integer score; (b) construction, from the first vector, of a second classification vector of the input data, such that the second vector also belongs to the first space of possible vectors and has a distance with the first vector according to a given distance function equal to a non-zero reference distance; and return of the second vector as result of the secure classification.

11 Claims, 2 Drawing Sheets

(51) Int. Cl.
  *G06K 9/62* (2022.01)
  *G06N 3/08* (2006.01)
  *G06V 40/10* (2022.01)
  *G06V 40/16* (2022.01)
  *G06V 40/50* (2022.01)

(52) U.S. Cl.
  CPC .............. *G06K 9/6277* (2013.01); *G06N 3/08* (2013.01); *G06V 10/82* (2022.01); *G06V 40/10* (2022.01); *G06V 40/172* (2022.01); *G06V 40/53* (2022.01)

(58) Field of Classification Search
  CPC ........ G06N 3/08; G06V 10/454; G06V 40/10; G06V 40/172; G06V 40/53
  See application file for complete search history.

(56) References Cited

U.S. PATENT DOCUMENTS

| | | | | |
|---|---|---|---|---|
| 2003/0099401 | A1* | 5/2003 | Driggs | G06K 9/6292 704/E15.049 |
| 2013/0103624 | A1* | 4/2013 | Thieberger | G06K 9/6256 706/12 |
| 2017/0154282 | A1* | 6/2017 | Rossi | G06V 10/94 |
| 2017/0372201 | A1* | 12/2017 | Gupta | G06N 3/0454 |
| 2018/0330179 | A1* | 11/2018 | Streit | G06N 3/08 |
| 2019/0026466 | A1* | 1/2019 | Krasser | G06N 20/20 |
| 2019/0188830 | A1* | 6/2019 | Edwards | G06N 3/0472 |
| 2019/0244138 | A1* | 8/2019 | Bhowmick | H04L 67/10 |
| 2019/0279047 | A1* | 9/2019 | Streit | G06V 40/70 |
| 2020/0034752 | A1* | 1/2020 | Luo | H04L 51/22 |
| 2020/0042828 | A1* | 2/2020 | Silberman | G06N 5/046 |
| 2020/0044852 | A1* | 2/2020 | Streit | G06F 21/32 |
| 2020/0065563 | A1* | 2/2020 | Zou | G06N 3/082 |
| 2020/0082259 | A1* | 3/2020 | Gu | G06N 3/0454 |
| 2020/0082270 | A1* | 3/2020 | Gu | G06N 3/0427 |
| 2020/0104636 | A1* | 4/2020 | Halevi | H04L 9/3239 |
| 2021/0141896 | A1* | 5/2021 | Streit | G06F 21/554 |

OTHER PUBLICATIONS

Dwork, Cynthia; McSherry, Frank; Nissim, Kobbi; Smith, Adam; "Calibrating Noise to Sensitivity in Private Data Analysis", Mar. 4, 2006, International Conference on Computer Analysis of Images and Patterns: CAIP 2017: Computer Analysis of Images and Patterns; [Lecture Notes in Computer Science; Lect. Notes Computer], Springer, Berlin, Heidelberg, pp. 265-284, XP047422635, ISBN: 978-3-642-17318-9.

Khalil-Hani, Mohamed; Sung, Liew Shan; "A Convolutional Neural Network Approach for face Verification", 2014 International Conference on High Performance Computing & Simulation (HPCS), IEEE, Jul. 21, 2014, pp. 707-714. XP032646463, ISBN: 978-1-4799-5312-7.

Papernot, Nicolas; Abadi, Martin; Erlingsson, Ulfar; Goodfellow, Ian; Talwar, Kunal; "Semi-supervised Knowledge Transfer for Deep Learning from Private Training Data", CORR (ARXIV), vol. 1610. 05755v4, Mar. 3, 2017, pp. 1-16, XP05549005.

Dwork, Cynthia; Kenthapadi, Krishnaram; McSherry, Frank; Mironov, Ilya; Naor, Moni; "Our Data, Ourselves: Privacy Via Distributed Noise Generation", May 28, 2006, International Conference on Computer Analysis of Images and Patterns, CAIP 2017: Computer Analysis of Imagesand Patterns; [Lecture Notes in Computer Science; Lect. Notes Computer], Springer, Berlin, Heidelberg, pp. 486-503, XP047422734, ISBN: 978-3-642-17318-9.

* cited by examiner

METHOD OF SECURE CLASSIFICATION OF INPUT DATA BY MEANS OF A CONVOLUTIONAL NEURAL NETWORK

CROSS-REFERENCE TO RELATED APPLICATIONS

This application claims the benefit of French Patent Application No. 1859203 filed Oct. 4, 2018, the disclosure of which is herein incorporated by reference in its entirety.

GENERAL TECHNICAL FIELD

The present invention relates to the field of biometrics, and in particular to a method of secure classification of input data by means of a convolutional neural network, for authentication/identification.

STATE OF THE ART

Neural networks are massively used for data classification.

After an automatic training phase (generally supervised, meaning on an already classified reference database), a neural network "learns" and becomes capable on its own of applying the same classification to unknown data.

Convolutional neural networks (CNN) are a type of neural network in which the connection pattern between neurons is inspired by the visual cortex of animals. They are thus particularly suited to a specific type of classification, which is image analysis; indeed they allow efficient recognition of people or objects in images or videos, in particular in security applications (e.g. automatic surveillance, threat detection, etc.).

In particular, the use of CNN is known in the field of police and antiterrorism. More specifically, police forces have databases of photographs, for example faces of individuals involved in cases. It is then possible to train CNN's to recognize faces in video surveillance data, particularly for detecting wanted individuals. Similarly, it can be imagined that governments have biometric databases, for example passport fingerprints. It is then possible to train CNN's to recognize prints of individuals in particular.

Currently, one problem that arises is that these databases are confidential, and restricted, (particularly national ones). Yet, it would be desirable for example for police forces of several states to cooperate and improve the overall efficiency of recognition, although without being able to go back to the confidential data.

However, in every case this would involve an entity (for example the police forces of a state) training their CNN's on the databases of another entity (the police forces of another state), i.e. the databases of photographs or other biometric traits are transmitted unencrypted, which is not currently feasible.

A clever solution has been proposed in application FR1852351 which, in spite of there being no common representation space, makes it possible to learn from "teachers" on each of the sets of confidential data, so as to be able to jointly train a "student" who in the end will have the knowledge from several sets of confidential data.

More specifically, the teachers will generate a training database for the student by classifying the raw public data thanks to a "voting" system of the teachers, perturbed where appropriate to avoid being able to go back to the individual sets of confidential data used in training the teachers.

Such a technique is entirely satisfactory, but could be simplified even more.

BRIEF DESCRIPTION OF THE INVENTION

According to a first aspect, the present invention concerns a method of secure classification of input data by means of a convolutional neural network, CNN, the method comprising the implementation by data processing means of at least one device, of steps of:

(a) Determination, by application of said CNN to said input data, of a first classification vector of said input data associating with each of a plurality of potential classes a representative integer score of the probability of said input data belonging to the potential class, the first vector corresponding to one possible vector among a first finite and countable set of possible vectors, each possible vector of the first set associating with each of the plurality of potential classes an integer score such that said scores of the possible vector constitute a composition of a predefined whole total value;

(b) Construction, from the first vector, of a second classification vector of said input data, such that the second vector also belongs to the first space of possible vectors and has a distance with the first vector according to a given distance function equal to a non-zero reference distance; and return of the second vector as result of the secure classification.

According to other advantageous and non-limiting characteristics:

said data are biometric data, particularly facial images;

the method is a method of authentication or identification of an individual, said input data being acquired about the individual;

step (b) comprises a sub step (b1) of selection of a third vector in a second finite and countable set of error vectors, each error vector of the second set associating with each of a plurality of potential classes a relative integer score such that a sum of said scores of the error vector is zero, and having a distance with the zero vector according to the given distance function equal to said non-zero reference distance; and a sub step (b2) of construction of the second vector as sum of the first vector and the third vector;

step (b) comprises a prior sub step (b0) of construction of said second set as a function of said reference distance;

step (b0) comprises the random selection of said reference distance;

the selection of said third vector in the second space is random;

said random selection of said third vector is not uniform, and is implemented based on the first vector by using a control database so as to produce a realistic noise;

said distance function is the standard L1, said reference distance being an integer;

the method comprising a step (a0) of training, from a training database of already classified confidential data, the parameters of said CNN.

According to a second and third aspect, the invention proposes a computer program product comprising code instructions for the execution of a method according to the first aspect of secure classification of input data by means of a convolutional neural network; and a storage means readable by a computer equipment on which a computer program product comprises code instructions for executing a method according to the first aspect of secure classification of input data by means of a convolutional neural network.

DESCRIPTION OF THE FIGURES

Other characteristics and advantages of the present invention will appear upon reading the following description of a preferred embodiment. This description will be given with reference to the attached drawings in which.

DETAILED DESCRIPTION

Principle

The present invention proposes a method of classification of input data using at least one CNN previously trained on a training database, particularly a confidential one.

Figure 1:
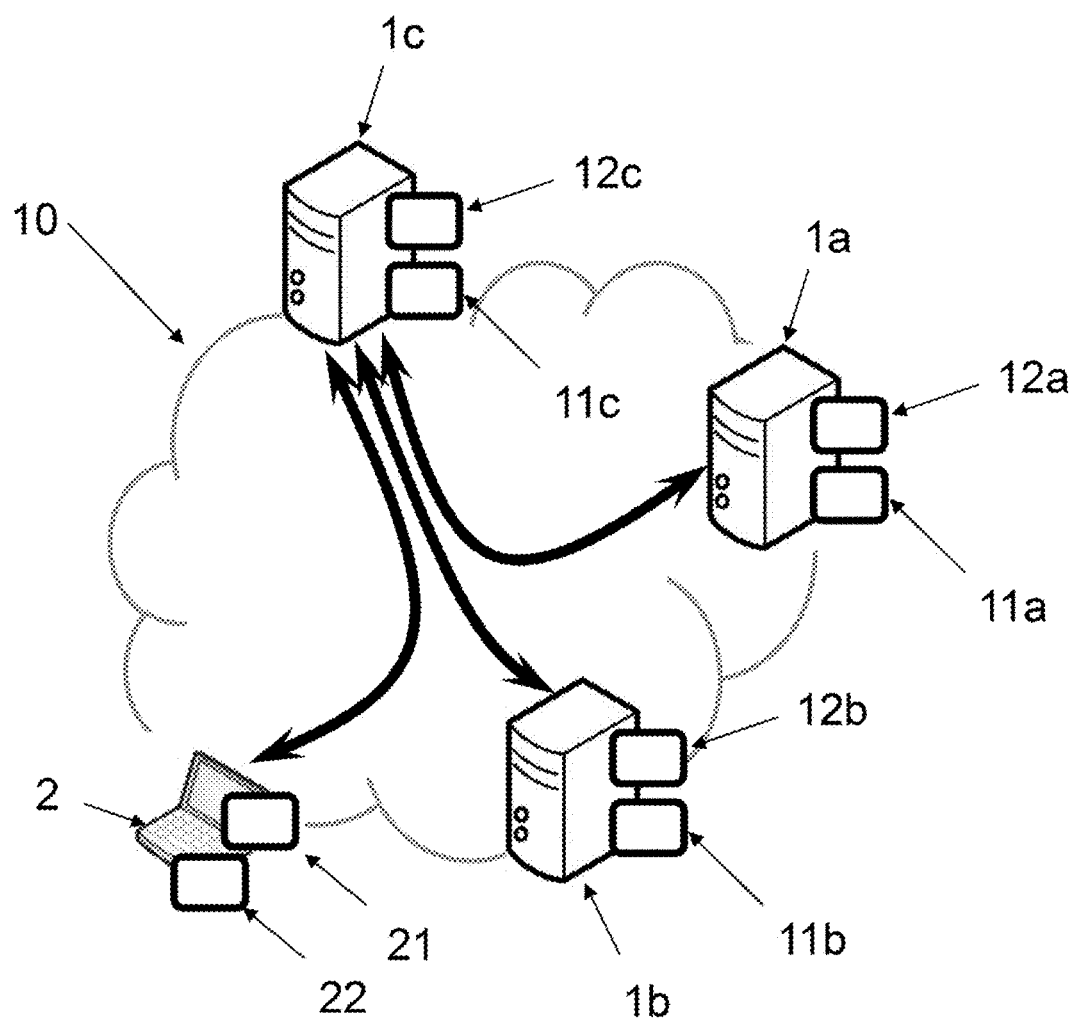
FIG. 1 is a diagram of an architecture for implementation of the methods according to the invention.
Figure 2:
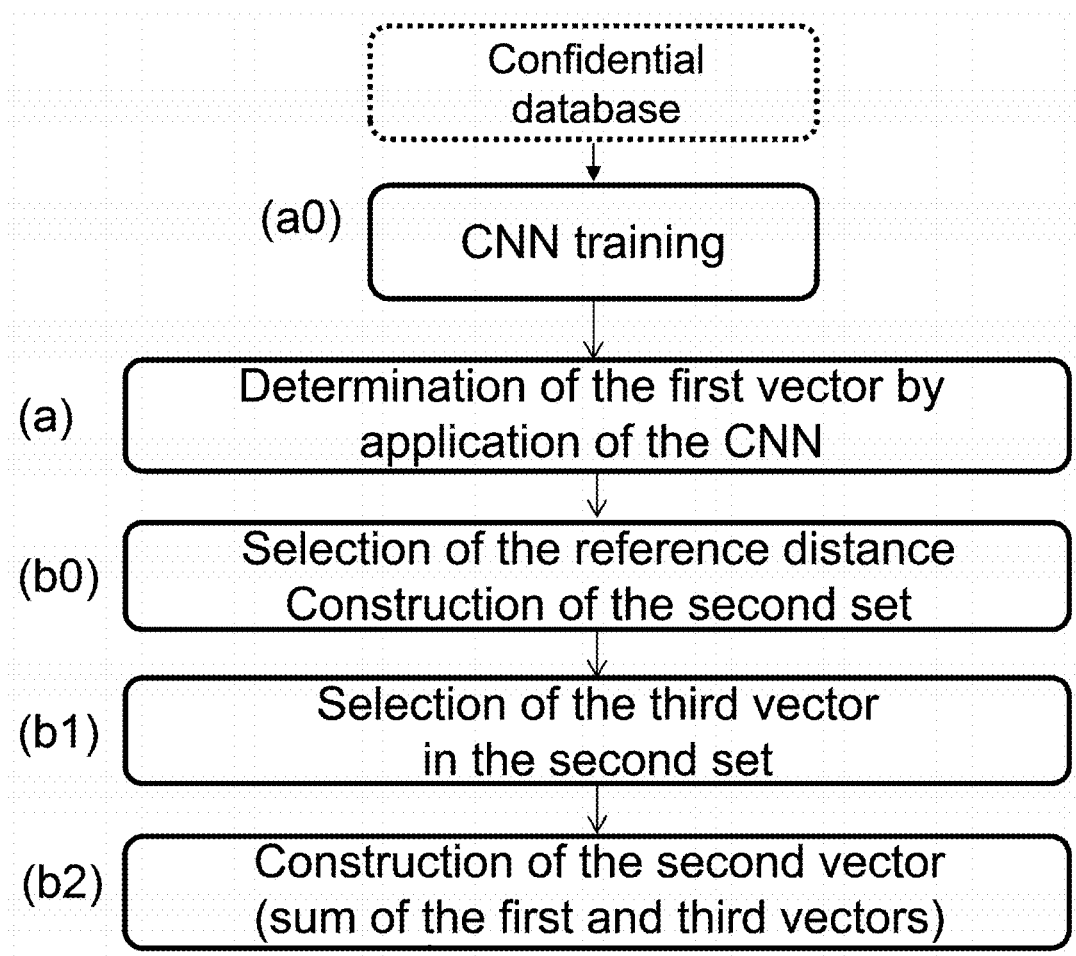
FIG. 2 schematically shows the steps of the secure classification method according to the invention.

The present method is implemented within an architecture such as shown by FIG. 1, thanks to one or more servers 1a, 1b, 1c and/or a terminal 2.

At least one of the servers 1a, 1b, 1c stores a confidential training database, i.e. a set of already classified data (in contrast to the data called input data, which is in fact to be classified). Preferably, there are at least two confidential training databases of already classified data, stored on two different servers (1a and 1b in FIG. 1), with no interactions: the server 1a cannot access the database of the server 1b and vice-versa.

The servers constitute independent entities. For example, it involves the databases of national police forces of two states.

Indeed, the input or training data are advantageously representative of images (said classification being recognition of an object, face, etc.) or any other biometric data (recognition of fingerprints, iris data, etc.); it will be understood that the face is one example of biometric data. The classification is then an identification/authentication of an individual about whom the input data is acquired, for example filmed by a surveillance camera (the classes correspond to known individuals).

Numerous embodiments are possible. According to a first embodiment, each server 1a, 1b is capable of managing a classifier on its own database, i.e. of training a dedicated CNN, and of using the CNN to classify a data transmitted for example from the terminal 2, which typically plays the role of client. In the event of a plurality of CNN's, it is assumed that there is a common pattern of classes, i.e. that an exhaustive list of potential classes is predefined. It should be noted that the trained CNN(s) can be embedded on the terminal 2 in order for said terminal to implement the classification method directly.

According to a second embodiment, a teacher/student mechanism can be used to train a CNN "common" to all the databases. To that end, the server 1c is advantageously an optional server that does not have a training database, and which can be assigned specifically to that task; see in particular the aforementioned application FR1852351. It should be noted that the role of said server 1c can easily be performed by either of servers 1a, 1b, but preferably it is a different server (i.e. partitioned) to avoid any risk of disclosure of the confidential databases of the servers 1a, 1b. Once again, the terminal 2 can request the classification by transmitting the input data, or install itself on the common CNN and implement the classification method directly.

It will be understood that the present invention is not limited to a plurality of databases, it is sufficient to have at least one entity capable of learning the parameters of at least one CNN from at least one training database (particularly confidential) of already classified data. In the case of multiple CNN's, the present method can simply be implemented as many times as there are CNN's.

The CNN(s) can have any architecture known to the person skilled in the art, and the training can be carried out in any known way.

In any case, each device 1a, 1b, 1c, 2 is typically remote computer equipment connected to an extended network 10 such as the Internet for the exchange of data. Each comprises processor-type data processing means 11a, 11b, 11c, 21, and data storage means 12a, 12b, 12c, 22 such as a computer memory, for example a drive.

Classification Method

Mathematically, $n \geq 1$ entities are considered, each of which:

must respond to a classification according to m predefined classes (m is generally large, especially in biometrics), has a number l of "points" to be distributed according to said m classes (typically, l=100, in order to work in percentage).

Thus, rather than a simple binary response, the classification can graduate the responses in order to obtain nuances that can be utilized by also knowing which are the closest classes (see document *Geoffrey Hinton, Oriol Vinyals, Jeff Dean: Distilling the Knowledge in a Neural Network). NIPS 2014*. This simply means that where a conventional classification determines THE class it considers to be that of the input data (for example the name of the person in a photo), the present classification can indicate one or more potential classes.

Thus, a classification vector is defined of a size m, written for example $o=(o_1, o_2, \ldots, o_m)$: the nth value $o_{i, i \in [\![1;m]\!]}$ of the vector is the score associated with the nth class. We have $l = \sum_{i=1}^{m} o_i$.

For example, for a given input data, a first class can have 90 points assigned to it, a second class 0 points, and a third class 10 points: this means that it is certain that the input data is not of the second class, and presumably is of the first class, but there remains a 10% chance that it is actually of the third class.

The number of points associated with each potential class is called "score," and within the scope of the present invention it involves an integer (a "natural" integer, i.e. a positive integer or zero, belonging to $\mathbb{N}$), and not for example a percentage as can be found in the state of the art. Similarly, the total number of points, called "total value," is another integer (natural), for example at least 10, possibly between 20 and 200, possibly between 50 and 150, and preferably 100.

Of course, it will be understood that the scores or the total value can be an integer "give or take a factor." For example, it would of course be within the scope of the present invention to choose scores multiples of 0.5: all the scores could be multiplied by two, as well as the total value, in order to reach scores multiples of 1, and therefore integers.

The classification can be seen as the determination of a classification vector of said input data associating each of a plurality of potential classes with an integer score representative of the probability of said input data belonging to the potential class.

Having a value in $\mathbb{N}$ makes the different scores associated with the potential classes constitute what is called a "composition" of the total value 1.

In combinatorics, a composition of a positive integer N is a representation of said integer as sum of a set of strictly positive integers. More precisely, it involves a k≥1 set of strictly positive integers called "parts." Thus, (1,2,1) is a composition of 4=1+2+1. Two sets that differ by the order of their parts are considered as different compositions. Thus, (2,1,1) is another composition of the integer 4. Reference can be made, for example, to the document *Silvia Heubach, Toufik Mansour, Compositions of n with parts in a set.*

The eight compositions of 4 are: (4); (1,3); (3,1); (2,2); (1,1,2); (1,2,1); (2,1,1); (1,1,1,1).

Therefore, the compositions differ from the integer partitions that consider sets without taking into account the order of their terms. For example, there are only five integer partitions of 4.

The principal property is that the number of compositions of an integer N is equal to $2^{N-1}$, and is therefore finite and countable. A first finite and countable set of possible classification vectors can therefore be defined, each possible vector of the first set associating with each of the plurality of potential classes an integer score such that said scores of the possible vector constitute a composition of the predefined whole total value.

In a first step (a), the method comprises the determination, by application of said CNN to said input data, of a first classification vector of said input data associating with each of a plurality of potential classes an integer score representative of the probability of said input data belonging to the potential class, the first vector corresponding to one possible vector among said first finite and countable set of possible vectors.

In other words, the CNN is used normally to obtain a classification.

It will be understood, as explained, that said first vector could reveal information in the training database(s), which prohibited if the database is confidential.

The present method proposes to cleverly use mechanisms called of differential privacy based on the properties of the composition.

Differential privacy has traditionally been used for "anonymized" databases. It is intended to define a form of protection of results of requests made to said databases while minimizing the risks of identification of the entities that it contains, if possible while maximizing the pertinence of the results of the request. For example, it has been shown in the document "*Differentially Private Password Frequency Lists*, 2016, https://eprint.iacr.org/2016/153.pdf" how to obtain perturbed frequency lists of passwords used by servers, so as to be able to publish them completely securely.

In the present method, it is therefore proposed to return not the first classification vector, but a different second vector in order to protect confidentiality. The second vector constitutes a "perturbed" classification, that must be remote enough to minimize risks of compromise of the database, but close enough for the second vector to remain reliable, i.e. that the scores it contains remain representative of the probability of said input data belonging to the potential class.

It should be noted that the differential privacy techniques used up to now considered three large structures to be able to produce a mechanism called "Laplace" on the frequencies. The algorithms had to incorporate a dynamic programming part to be able to function, and it would have been impossible to use them as such in classification.

On the contrary, in a step (b) the present method proposes the construction, from the first vector, of the second classification vector of said input data, such that the second vector also belongs to the first space of possible vectors and has a distance with the first vector according to a given distance function equal to a non-zero reference distance.

Here, it is important to understand that the distance between the two vectors is equal to the reference distance (denoted as d), and not just less than a threshold. Thus, the search is not just for "close" vectors, but rather for different vectors. A vector that is equal to or too similar to the first vector cannot be obtained as second vector. This makes it possible, as will be seen, to obtain the second vector very easily, while guaranteeing a minimum level of noise.

The idea is that the scores of the second vector form another composition of the total value, and thus the set of vectors that can constitute an acceptable second vector is included in the first set, which as will be remembered is finite and countable. There is therefore no need for any complex mechanism for construction of the second vector.

Numerous distance functions can be used, particularly the standards L1, L2, L∞. The standards L1 and L∞ are very advantageous, because if the vectors only have integer components, as is presently the case, the distance thereof according to these standards is also an integer. The reference distance d can then be chosen as an integer value (strictly positive). Preferably, the standard L1 is chosen as distance function, which gives excellent results.

In one example wherein, for an input data, a 1st class is assigned 90 points, a 2nd class 0 points, and a 3rd class 10 points, the first vector is valued at (90,0,10). If the standard L1 is chosen as distance function and a reference difference d=5, (87,1,11) can be taken as second vector, for example. It will be noted that the classification information is identical: the input data is presumably of the 1st class, and possibly of the 3rd class, while being perturbed.

Several ways of achieving step (b) will be seen, but by identifying the first vector as o and the second vector as ô, ô=o+e can be stated with a third vector e=($e_1, e_2, \ldots, e_m$) called "error vector" (which corresponds to added noise).

It will be noted that:
$\Sigma_{i=1}^{m} e_i = 0$, since $\Sigma_{i=1}^{m} \hat{o}_i = 1$; and
distance(e,0)=distance(ô, o)=d, where "0" is the null vector (all the scores equal to zero).

Thus, all the error vectors form a finite and countable set (called second set) of error vectors, each error vector of the second set associating with each of a plurality of potential classes a relative integer score such that a sum of said scores of the error vector is zero, and having a distance with the zero vector according to the given distance function equal to said non-zero reference distance.

It will be understood that the error vectors are not classification vectors, and have values that are "relative" integers, i.e. possibly negative, belonging to $\mathbb{Z}$.

By designating the set of all the error vectors as E and the second set as $E_d$, it is seen that all the $E_d$ (for d from 1 to 2 l) forms a partition of E. Since the set E is countable, it can be ordered easily, and a fortiori $E_d$ such that a third vector can be chosen therefrom, especially randomly.

Advantageously the process is as follows:
In a first sub-step (b0), said second set is constructed as a function of said reference distance. The step (b0) can comprise the selection of said reference distance d, especially randomly, particularly as a function of said predefined total value l. For example, it can be chosen within a given interval, for example between 1% and 50%, possibly between 2% and 20%, possibly between 5% and 10%, of the total value l. It should be noted that alternatively d can be predefined.

In a second sub-step (b1), the third vector is selected, particularly randomly, in the second set.

Finally, in a third sub-step (b2), the second vector is constructed as the sum of the first vector and the third vector.

The second vector can then be returned (i.e. published) as a result of the classification. The first vector is not revealed.

Unfortunately on real data, uniform noise is not realistic. There is a correlation between the different coordinates of the first vector, and if possible the noise to be applied thereto (the third vector) should not be arbitrary. To do this, the use of a control database is advantageously proposed, having a realistic distribution and constituting a reference, particularly a real database (i.e. constituted naturally), so as to generate a third vector that is realistic in the zone of the space wherein the first vector is located.

As an alternative to the use of the second set of error vectors, it is noted that it is possible to construct in step (b) all the possible vectors having a distance with the first vector according to said given distance function equal to the non-zero reference distance. Indeed, it is understood that it involves a sub-set of the first set and is therefore also finite and countable.

A vector from said subset can then be chosen directly, for example randomly, as second vector.

Computer Program Product

According to a second and a third aspects, the invention relates to a computer program product comprising code instructions for execution (in particular on data processing means 11a, 11b, 11c, 21 of one or more servers 1a, 1b, 1c or the terminal 2) of a method according to the first aspect of the invention of secure classification of input data, as well as storage means readable by computer equipment (a memory 12a, 12b, 12c, 22 of one or more servers 1a, 1b, 1c or of the terminal 2) on which said computer program product is located.

The invention claimed is:

1. A method of secure classification of an input data by means of a convolutional neural network, CNN, the method comprising an implementation by data processing means of at least one device, of steps of:
   (a) determination, by application of said CNN to said input data, of a first classification vector of said input data associating with each of a plurality of potential classes a representative integer score of the probability of said input data belonging to the potential class, the first vector corresponding to one possible vector among a first finite and countable set of possible vectors, each possible vector of the first set associating with each of the plurality of potential classes an integer score such that said scores of the possible vector constitute a composition of a predefined whole total value;
   (b1) selection of a third vector in a second finite and countable set of error vectors, each error vector of the second set associating with each of a plurality of potential classes a relative integer score such that a sum of said scores of the error vector is zero, and having a distance with a zero vector according to a given distance function equal to a non-zero reference distance; and
   (b2) construction of a second classification vector of said input data as a sum of the first vector and the third vector, such that the second vector also belongs to a first space of possible vectors and has a distance with the first vector according to the given distance function equal to the non-zero reference distance; and return of the second vector as a result of the secure classification.

2. The method according to claim 1, wherein said data are biometric data, in particular facial images.

3. The method according to claim 1, being a method of authentication or identification of an individual, said input data being acquired about the individual.

4. The method according to claim 1, wherein the step (b1) comprises a prior sub-step (b0) of construction of said second set as a function of said reference distance.

5. The method according to claim 4, wherein the step (b0) comprises the random selection of said reference distance.

6. The method according to claim 1, wherein the selection of said third vector in the second space is random.

7. The method according to claim 6, wherein said random selection of said third vector is not uniform and is implemented as a function of the first vector by using a control database so as to reproduce a realistic noise.

8. The method according to claim 1, wherein said distance function is a standard L1, said reference distance being an integer.

9. The method according to claim 1, comprising a step (a0) of training, from a training database of already classified confidential data, parameters of said CNN.

10. A non-transitory computer readable medium comprising code instructions for the execution of a method according to claim 1 of secure classification of input data by means of a convolutional neural network, when said program is executed by a computer.

11. A non-transitory computer readable medium on which a computer program product comprises code instructions for the execution of a method according to claim 1 of secure classification of an input data by means of a convolutional neural network.

* * * * *